United States Patent
Zhou

(10) Patent No.: US 7,983,486 B2
(45) Date of Patent: Jul. 19, 2011

(54) METHOD AND APPARATUS FOR AUTOMATIC IMAGE CATEGORIZATION USING IMAGE TEXTURE

(75) Inventor: Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 993 days.

(21) Appl. No.: 11/847,028

(22) Filed: Aug. 29, 2007

(65) Prior Publication Data
US 2009/0060340 A1    Mar. 5, 2009

(51) Int. Cl.
*G06K 9/46*    (2006.01)
(52) U.S. Cl. ........ 382/190; 382/199; 382/224; 382/282; 358/3.26; 358/3.27
(58) Field of Classification Search ................ 382/190, 382/260, 274, 275, 199, 224, 266, 282; 358/3.26, 358/3.27
See application file for complete search history.

(56) References Cited

U.S. PATENT DOCUMENTS

| | | | |
|---|---|---|---|
| 6,753,965 B2 * | 6/2004 | Kumar et al. | 356/431 |
| 6,762,769 B2 | 7/2004 | Guo et al. | |
| 6,922,489 B2 | 7/2005 | Lennon et al. | |
| 7,012,624 B2 | 3/2006 | Zhu et al. | |
| 7,068,809 B2 * | 6/2006 | Stach | 382/100 |
| 7,085,426 B2 * | 8/2006 | August | 382/260 |
| 7,130,474 B2 * | 10/2006 | Luo et al. | 382/239 |
| 7,130,484 B2 * | 10/2006 | August | 382/266 |
| 7,542,610 B2 * | 6/2009 | Gokturk et al. | 382/209 |
| 2002/0171660 A1 | 11/2002 | Luo et al. | |
| 2003/0174892 A1 | 9/2003 | Gao et al. | |
| 2005/0047663 A1 | 3/2005 | Keenan et al. | |
| 2006/0039593 A1 | 2/2006 | Sammak et al. | |

* cited by examiner

*Primary Examiner* — Yosef Kassa
(74) *Attorney, Agent, or Firm* — Mark P. Watson

(57) ABSTRACT

A method of automatically categorizing an input image comprises extracting texture features of the input image and generating a signature vector based on extracted texture features. The generated signature vector is processed using at least one classifier to classify the input image.

15 Claims, 8 Drawing Sheets

| DI | NI |
|---|---|
| DC | NC |
| 45 bins (edge direction) | 1 bin (non-edge) |

Fig. 7

| | | P | | |
|---|---|---|---|---|
| 20 | 20 | 30 | 40 | 70 |
| 20 | 20 | 10 | 30 | 20 |
| 60 | 70 | ■ | 70 | 30 |
| 60 | 21 | 70 | 70 | 10 |
| 30 | 25 | 70 | 70 | 70 |

Fig. 8

METHOD AND APPARATUS FOR AUTOMATIC IMAGE CATEGORIZATION USING IMAGE TEXTURE

FIELD OF THE INVENTION

The present invention generally relates to image processing, and more specifically, to a method, apparatus, and computer readable medium embodying a computer program for automatically categorizing images using image texture.

BACKGROUND OF THE INVENTION

In large media management systems it is desired to categorize images that have general semantic similarity so that stored images can be efficiently and effectively retrieved. Categorizing images manually is time consuming and impractical especially where large numbers of images are being categorized and thus, techniques to automatically categorize images are desired.

Techniques for automatically categorizing images have been considered. For example, U.S. Pat. No. 5,872,865 to Normile et al. discloses a system for automatically classifying images and video sequences. The system executes a classification application that is trained for an initial set of categories to determine eigen values and eigen vectors that define the categories. Input video sequences are then classified using one of orthogonal decomposition using image attributes, orthogonal decomposition in the pixel domain and neural net based classification. A set of primitive attributes based on average bin color histogram, average luminance on intensity, average motion vectors and texture parameters is generated for frames of the video sequence. Frames of the video sequence are transformed into canonical space defined by the eigen vectors allowing the primitive attributes to be compared to the eigen values and the eigen vectors defining the categories thereby to allow the frames to be classified.

U.S. Pat. No. 6,031,935 to Kimmel discloses a method and apparatus for segmenting images using deformable contours. A priori information concerning a target object to be segmented i.e. its border, is entered. The target object is manually segmented by tracing the target object in training images thereby to train the apparatus. A search image is then chosen and a nearest-neighbour training image is selected. The traced contour in the training image is then transferred to the search image to form a search contour. The search contour is deformed to lock onto regions of the target object which are believed to be highly similar based on the a priori information and the training information. Final segmentation of the search contour is then completed.

U.S. Pat. No. 6,075,891 to Burman discloses a non-literal pattern recognition method and system for hyperspectral imagery exploitation. An object is scanned to produce an image set defining optical characteristics of the object including non-spatial spectral information and electromagnetic spectral band data. A spectral signature from a single pixel in the image set is extracted. The spectral signature is then filtered and normalized and forwarded to a material categorization system to identify categories related to the sensed data. A genetic algorithm is employed that solves a constrained mixing equation to detect and estimate the abundance of constituent materials that comprise the input spectral signature.

U.S. Pat. No. 6,477,272 to Krumm et al. discloses a system and process for identifying the location of a modelled object in a search image. Model images of the object, whose location is to be identified in the search image, are captured. Each model image is computed by generating counts of every pair of pixels whose pixels exhibit colors that fall within the same combination of a series of pixel color ranges and which are separated by a distance falling within the same one of a series of distance ranges. A co-occurrence histogram is then computed for each of the model images. A series of search windows is generated from overlapping portions of the search image. A co-occurrence histogram is also computed for each of the search windows using the pixel color and distance ranges established for the model images. A comparison between each model image and each search window is conducted to assess their similarity. The co-occurrence histograms from the model images and the search image windows are then compared to yield similarity values. If a similarity value is above a threshold, the object is deemed to be in the search window.

U.S. Pat. No. 6,611,622 to Krumm discloses an object recognition system and process that identifies people and objects depicted in an image of a scene. Model histograms of the people and objects that are to be identified in the image are created. The image is segmented to extract regions which likely correspond to the people and objects being identified. A histogram is computed for each of the extracted regions and the degree of similarity between each extracted region histogram and each of the model histograms is assessed. The extracted region having a histogram that exhibits a degree of similarity to one of the model histograms, which exceeds a prescribed threshold, is designated as corresponding to the person or object associated with that model histogram.

U.S. Pat. No. 6,668,084 to Minami discloses an image recognition method wherein search models are created that identify the shape and luminance distribution of a target object. The goodness-of-fit indicating correlation of the object for each one of the search models is calculated and the search models are rearranged based on the calculated goodness-of-fit. Object shapes are modelled as polygons and the luminance values are taken to be the inner boundaries of the polygons.

U.S. Pat. No. 6,762,769 to Guo et al. discloses a system and method for synthesizing textures from an input sample using an accelerated patch-based sampling system to synthesize high-quality textures in real-time based on a small input texture sample. Potential feature mismatches across patch boundaries are avoided by sampling patches according to a non-parametric estimation of the local conditional Markov Random Field (MRF) density function.

U.S. Pat. No. 6,922,489 to Lennon et al. discloses a method of interpreting an image using a statistical or probabilistic interpretation model. During the method, contextual information associated with the image is analyzed to identify predetermined features relating to the image. The statistical or probabilistic interpretation model is biased in accordance with the identified features.

U.S. Pat. No. 7,012,624 to Zhu et al. discloses a method for generating texture. During the method, a target patch to be filled in an image is determined and a sample patch is selected as a candidate for filling the target patch. A first difference between a first area surrounding the target patch and a corresponding first area surrounding the sample patch, and a second difference between a second area surrounding the target patch and a corresponding second area surrounding the sample patch are determined. The larger of the first difference and the second difference is multiplied with a first weight factor, and the smaller of the first difference and the second difference is multiplied with a second weight factor. The weighted first difference and the weighted second difference are summed to yield the distance between the target patch and the sample patch.

U.S. Patent Application Publication No. US2001/0012062 to Anderson discloses a system and method for analyzing and categorizing images. Analysis modules examine captured image files for selected criteria and then generate and store appropriate category tags with the images to enable desired categories of images to be automatically accessed. One analysis module analyzes the final line of image data at a red, green, blue (RGB) transition point to generate category tags. Another analysis module performs gamma correction and color space conversion to convert the image data into YCC format and then analyzes the final line of the image data at a YYC transition point to generate the category tags.

U.S. Patent Application Publication No. US2002/0131641 to Luo et al. discloses a system and method for determining image similarity. Perceptually significant features of the main subject or background of a query image are determined. The features may include color texture and/or shape. The main subject is indicated by a continuously valued belief map. The determined perceptually significant features are then compared with perceptually significant features of images stored in a database to determine if the query image is similar to any of the stored images.

U.S. Patent Application Publication No. 2002/0171660 to Luo et al. discloses a multi-resolution block sampling based texture analysis/synthesis algorithm. A reference texture is assumed to be a sample from a probability function. The synthesis of a similar, but distinctive, synthetic texture is handled by an apparatus that first estimates and then re-samples the probability function. In order to achieve good and fast estimation of the probability function for a reference texture and in order to retain the texel structural information during the synthesis, a block sampling and texture synthesis scheme based on multi-resolution block sampling is employed. A process, which integrates estimation of dominant texture direction and the synthesis algorithm is employed to handle directional textures. The dominant direction is used to orient and then control the synthesis process so as to preserve the dominant reference image direction.

U.S. Patent Application Publication No. US2002/0183984 to Deng et al. discloses a system and method for categorizing digital images. Captured images are categorized on the basis of selected classes by subjecting each image to a series of classification tasks in a sequential progression. The classification tasks are nodes that involve algorithms for determining whether classes should be assigned to images. Contrast-based analysis and/or meta-data analysis is employed at each node to determine whether a particular class can be identified within the images.

U.S. Patent Application Publication No. US2003/0053686 to Luo et al. discloses a method for detecting subject matter regions in a color image. Each pixel in the image is assigned a belief value as belonging to a subject matter region based on color and texture. Spatially contiguous candidate subject matter regions are formed by thresholding the belief values. The spatially contiguous subject matter regions are then analyzed to determine the probability that a region belongs to the desired subject matter. A map of the detected subject matter regions and associated probabilities is generated.

U.S. Patent Application Publication No. 2003/0174892 to Gao et al. discloses a technique for automated selection of a parameterized operator sequence to achieve a pattern classification task. A collection of labelled data patterns is input and statistical descriptions of the inputted labelled data patterns are then derived. Classifier performance for each of a plurality of candidate operator/parameter sequences is determined. The optimal classifier performance among the candidate classifier performances is then identified. Performance metric information, including, for example, the selected operator sequence/parameter combination, is outputted. The operator sequences can be chosen from a default set of operators, or may be a user-defined set. The operator sequences may include morphological operators, such as, erosion, dilation, closing, opening, close-open, and open-close.

U.S. Patent Application Publication No. US2004/0066966 to Schneiderman discloses a system and method for determining a set of sub-classifiers for an object detection program. A candidate coefficient-subset creation module creates a plurality of candidate subsets of coefficients. The coefficients are the result of a transform operation performed on a two-dimensional digitized image and represent corresponding visual information from the digitized image that is localized in space, frequency and orientation. A training module trains a sub-classifier for each of the plurality of candidate subsets of coefficients. A sub-classifier selection module selects certain of the sub-classifiers. The selected sub-classifiers examine each input image to determine if an object is located within a window of the image. Statistical modeling is used to take variations in object appearance into account.

U.S. Patent Application Publication No. US2004/0170318 to Crandall et al. discloses a method for detecting a color object in a digital image. Color quantization is performed on a model image including the target object and on a search image that potentially includes the target object. A plurality of search windows are generated and spatial-color joint probability functions of each model image and search image are computed. The color co-occurrence edge histogram is chosen to be the spatial-color joint probability function. The similarity of each search window to the model image is assessed to enable search windows containing the target object to be designated.

U.S. Patent Application Publication No. 2005/0047663 to Keenan et al. discloses a method that facilitates identification of features in a scene which enables enhanced detail to be displayed. One embodiment incorporates a multi-grid Gibbs-based algorithm to partition sets of end-members of an image into smaller sets upon which spatial consistency is imposed. At each site within an imaged scene, not necessarily a site entirely within one of the smaller sets, the parameters of a linear mixture model are estimated based on the smaller set of end-members in the partition associated with that site. An enhanced spectral mixing process (SMP) is then computed. One embodiment employs a simulated annealing method of partitioning hyper-spectral imagery, initialized by a supervised classification method to provide spatially smooth class labelling for terrain mapping applications. One estimate of the model is a Gibbs distribution defined over a symmetric spatial neighbourhood system that is based on an energy function characterizing spectral disparities in both Euclidean distance and spectral angle.

Although the above references disclose techniques for categorizing images, improvements are desired. It is therefore at least one object of the present invention to provide a novel method, apparatus, and computer readable medium embodying a computer program for automatically categorizing images.

SUMMARY OF THE INVENTION

Accordingly, in one aspect there is provided a method of automatically categorizing an input image. The method comprises extracting texture features of the input image and generating a signature vector based on extracted texture features. The signature vector is processed using at least one classifier to classify the input image.

In one embodiment, texture features of the input image are extracted using a non-parametric Markov Random Field (MRF) model and based on localized edge orientation coherence. The method may further comprise, prior to the extracting, pre-processing the input image. The pre-processing may include one or more of noise filtering and normalizing of the input image. In another embodiment, during pre-processing, the input image is converted to a gray-scale image and the gray-scale image is normalized according to a pre-selected image resolution.

According to another aspect, a categorization system for automatically categorizing an input image is provided. The categorization system comprises a signature vector generator operative to extract texture features of the input image and generate a signature vector based on extracted features. A processing node network, which is operatively coupled to the signature vector generator, is adapted to process the generated signature vector using at least one classifier to classify the input image.

In one embodiment, the signature vector comprises an edge orientation component and a texture component. The signature vector generator generates the edge orientation component based on local edge orientation coherence of pixels in the input image and generates the texture component based on a non-parametric Markov Random Field (MRF) texture model.

According to yet another aspect, a method of automatically categorizing an input image is provided. The method comprises pre-processing the input image to form a gray-scale image if required. A first edge image is generated by performing edge detection on the gray-scale image. An intensity threshold value is then calculated from the first edge image. A threshold edge image is generated by applying the threshold value to the first edge image. The thresholded edge image is then processed using a texture model to generate texture features for categorizing the input image.

According to still yet another aspect, a computer-readable medium embodying machine-readable code for categorizing an input image is provided. The machine-readable code comprises machine-readable code for extracting texture features of the input image and generating a signature vector based on extracted texture features and machine-readable code for processing the signature vector using at least one classifier to classify the input image.

The method, apparatus, and computer readable medium embodying a computer program for automatically categorizing images are, among other things, flexible, robust, improve accuracy over known image categorizing techniques, and reduce the significant processing overhead existing in many image processing techniques.

BRIEF DESCRIPTION OF THE DRAWINGS

Embodiments will now be described more fully with reference to the accompanying drawings in which:

FIG. 7 is an exemplary localized edge orientation coherence vector (LEOCV) matrix;

FIG. 8 is an exemplary edge orientation coherence pixel window; and

DETAILED DESCRIPTION OF THE EMBODIMENTS

Figure 1:
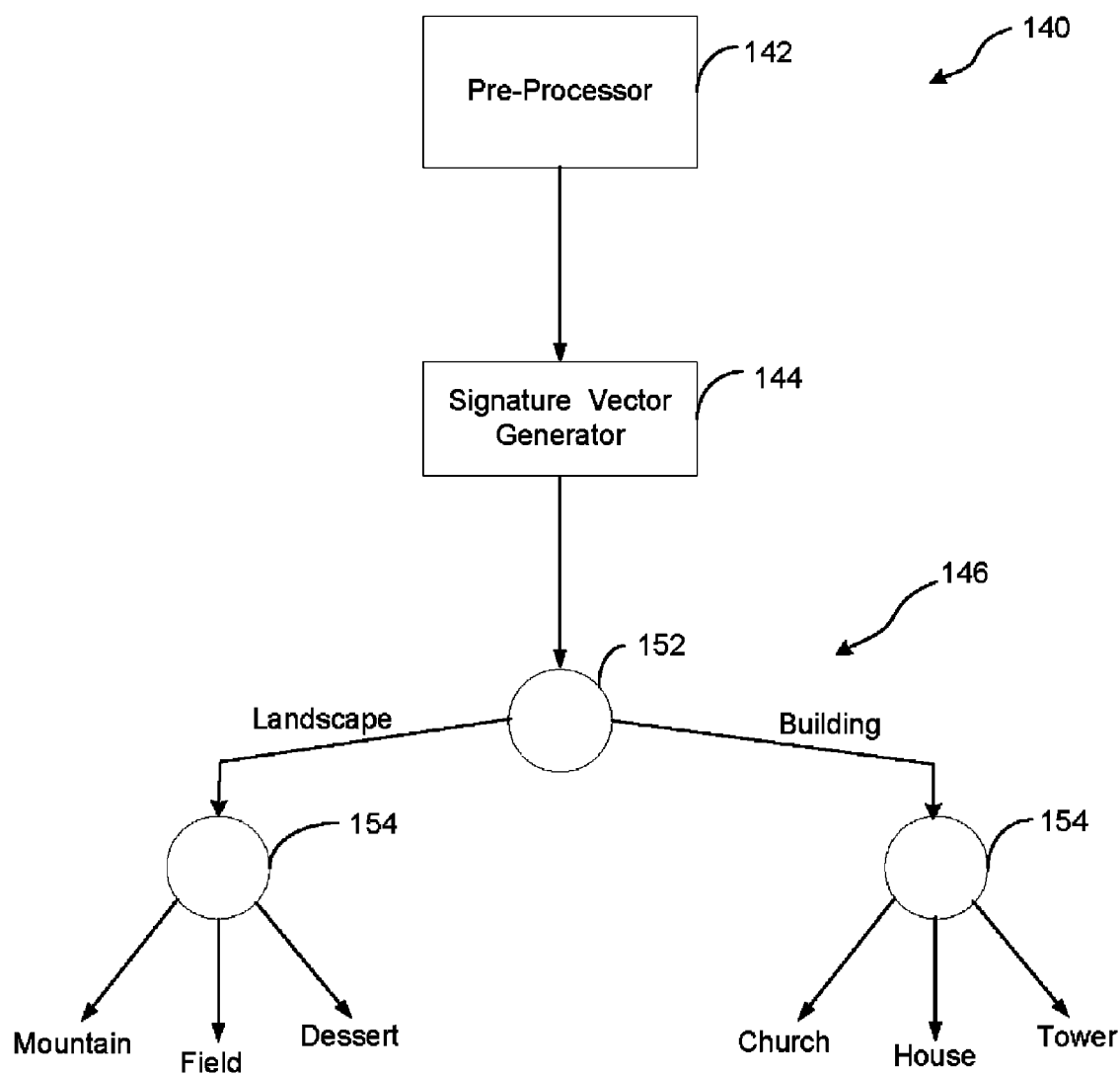
FIG. 1 is a schematic view of an image categorization system.

Turning now to FIG. 1, a categorization system for automatically categorizing images is shown and is generally identified by reference numeral 140. As can be seen, categorization system 140 comprises a pre-processor 142 for converting a received image to a gray-scale format (if in color), removing noise from the received image, and normalizing the received image to a desired resolution (e.g., 320×240). A signature vector generator 144 receives each pre-processed image output by the pre-processor 142 and generates a signature vector based on texture features of the image. A series of categorization nodes arranged in a tree-like hierarchical structure 146 that are responsible for categorizing input images into classes and sub-classes, communicates with the signature vector generator 144. The top node 152 of the structure 146 receives the signature vector generated by the signature vector generator 144 for each received image and provides texture feature output to an underlying row of nodes 154 based on the classes to which the input image is categorized.

In this embodiment, each node 152 and 154 has one input and a plurality of outputs. Each output represents a class or sub-class that is categorized by the node. For example, as illustrated, node 152 categorizes each input image into one of "landscape" and "building" classes. Node 154 in the underlying row receives the signature vector generated for each input image that has been assigned to the "landscape" class by node 152 and further categorizes the input image into "mountain", "field" and "desert" subclasses. Node 154 in the underlying row receives the signature vector generated for each input image that has been assigned to the "building" class by node 152 and further categorizes the input image into "church", "house" and "tower" subclasses. Although the categorization system 150 as shown includes only a single underlying row of nodes 154 comprising two (2) nodes, those of skill in the art will appreciate that this is for ease of illustration. Many underlying rows of nodes, with each underlying row having many nodes 154, are typically provided to allow input images to be categorized into well defined, detailed subclasses.

Figure 2:
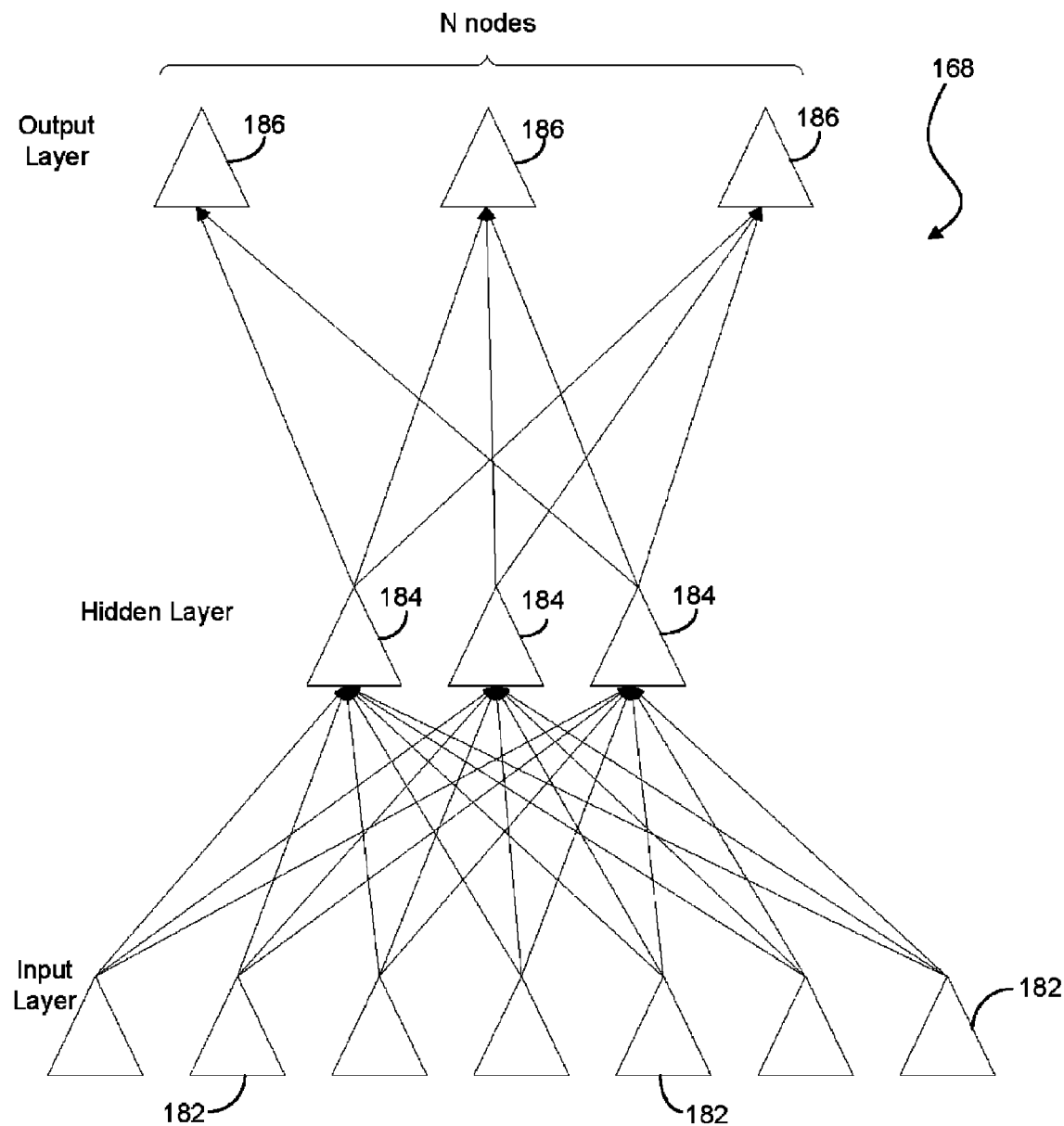
FIG. 2 is a schematic view of a back-propagation artificial neural network classifier forming part of the categorization system of FIG. 1.

Each categorization node 152 and 154 comprises one N-class back-propagation neural network (BPNN) classifier 168, where N is the number of classes or sub-classes that is categorized by the node as shown in FIG. 2. As will be appreciated, although each categorization node in this embodiment comprises a BPNN classifier, each categorization node may employ a number of diverse classifiers, with each diverse classifier having a different area of strength. For example, K-mean-nearest-neighbour and binary perceptron linear classifiers may be used in conjunction with the BPNN classifier 168.

The back-propagation neural network classifier 168 comprises a layer of input nodes 182, with each input node receiving a respective bin of the signature vector, a layer of hidden nodes 184 coupled to the input nodes 182 via weights and a layer of N output nodes 186 coupled to the hidden nodes 184, where N is the number of sub-classes handled by the categorization node as shown in FIG. 2.

Depending on the activity on the input nodes 182, the weights are changed by an amount dependent on the error across the layer of hidden nodes 184. When an input signature vector is being classified, the hidden node outputs and errors at the hidden nodes are calculated. When training is being performed, the error across the layer of hidden nodes is back-propagated through the hidden layers and the weights on the hidden nodes 184 are adjusted.

Figure 3:
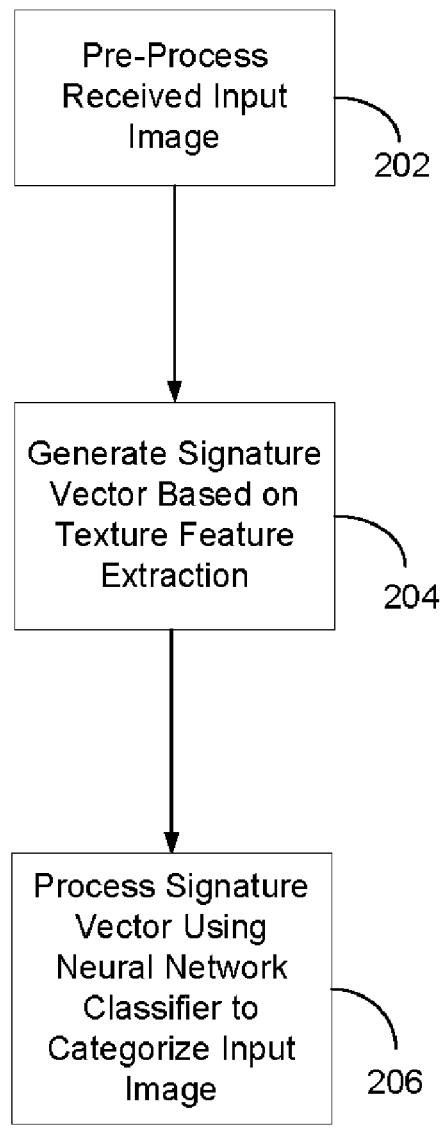
FIG. 3 is a flowchart showing the general steps performed during automatic image categorization.

Turning now to FIG. 3, a flowchart showing the general steps performed by the categorization system 140 (FIG. 1) during automatic image categorization is shown. Initially, at step 202, when an input image is to be automatically categorized, the pre-processor 142 (FIG. 1) determines whether the input image is in a color format (e.g., HSI or RGB format). If the image includes a color component, the pre-processor 142 performs a color-to-gray scale conversion on the input image. Other pre-processing operations such as filtering of the input image to remove noise may also be carried out. For example, the input image may be passed through a 3×3 box filter to remove noise. Following the color-to-gray scale conversion and optional filtering process, the input image is normalized to a 320×240 image resolution (step 202). Once converted to gray-scale format and normalized, the signature vector generator 144 (FIG. 1) subjects the input image to texture feature extraction and generates a resultant multi-bin signature vector based on edge orientation coherence and non-parametric Markov Random Field (MRF) texture of the input image (step 204). The resultant signature vector is then fed to the structure 146 for image classification, where the bins of the signature vector are processed by the back-propagation neural network classifiers 168 of nodes 152 and 154 (step 206).

In the described embodiment, each input node of the back-propagation neural network classifier 168 (FIG. 2) receives an associated bin of the signature vector. The back-propagation neural network classifier 168 in response generates a weighted output representing the degree to which the classifier 168 believes the input image represents each class categorized by the node 152 (FIG. 1). Once node 152 (FIG. 1) has categorized the input image into a class, the signature vector is applied to the node 154 (FIG. 1) associated with that class for further sub-class categorization in a manner similar to that described above.

For example, if the class output of node 152 is determined to be "building", then the "building" node 154 receives the signature vector for further sub-class categorization. When the node 154 receives the signature vector, the classifiers therein act on the signature vector in the same manner described above to categorize further the input image.

Figure 4:
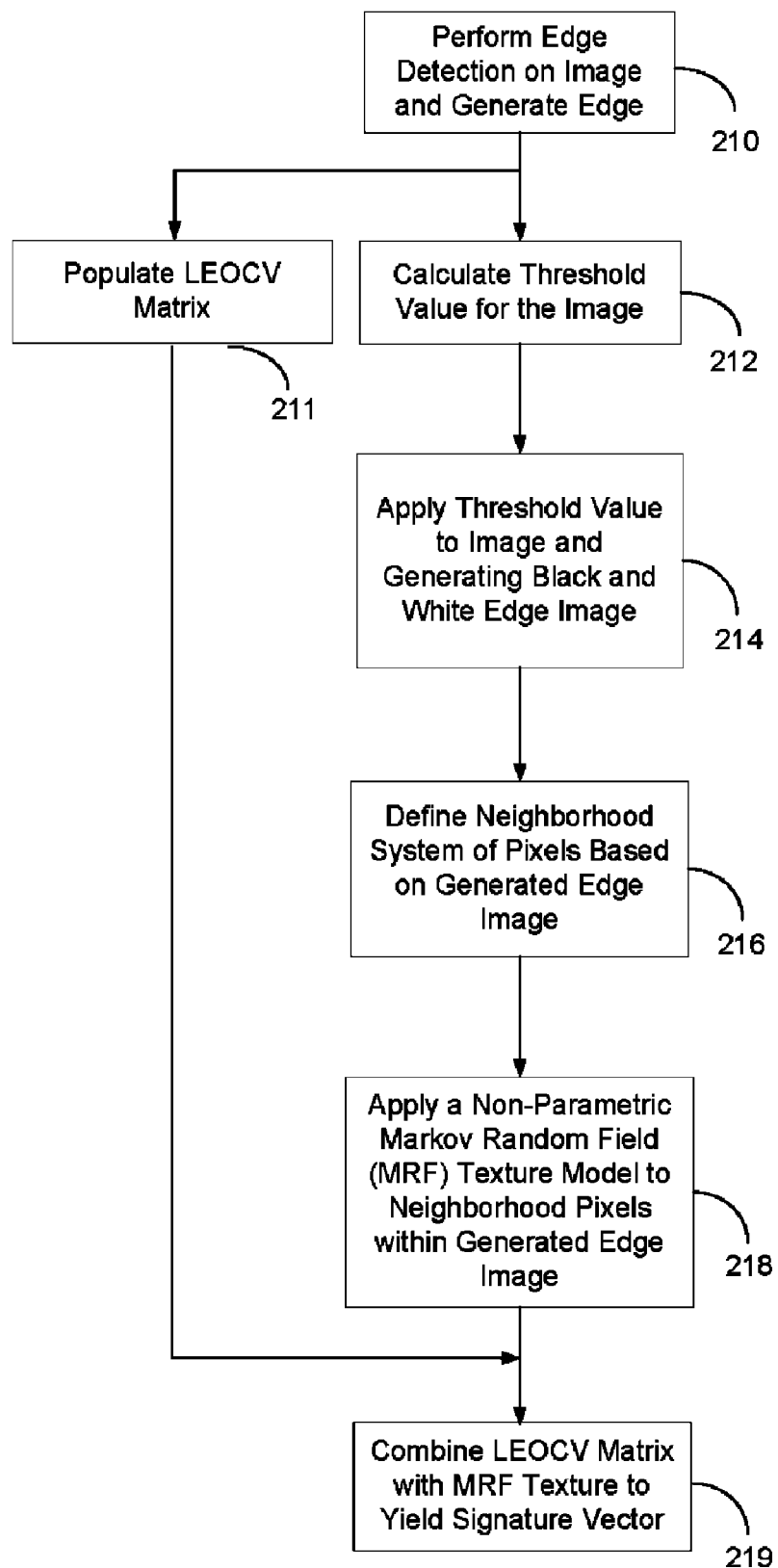
FIG. 4 is a flowchart showing the steps performed during the image extraction process.

Turning now to FIG. 4, a flowchart showing the steps performed by the signature vector generator 144 during texture feature extraction is illustrated. Following pre-processing at step 202 (FIG. 3), the input image is subjected to edge detection where edge pixels in the input image are identified based on one or more edge detection techniques (step 210). In this embodiment, a Canny edge detector is used to detect edge pixels in the input image and an edge image is generated.

Once the edge image has been generated using the Canny edge detector, a threshold value for the edge image is determined (step 212). In determining the threshold value, one of several thresholding algorithms may be used. In this embodiment, the threshold value is determined by calculating the average mean of active pixels within the edge image, where an active pixel is defined as a pixel having an edge magnitude that is larger than a predetermined small residual value.

Figure 5:
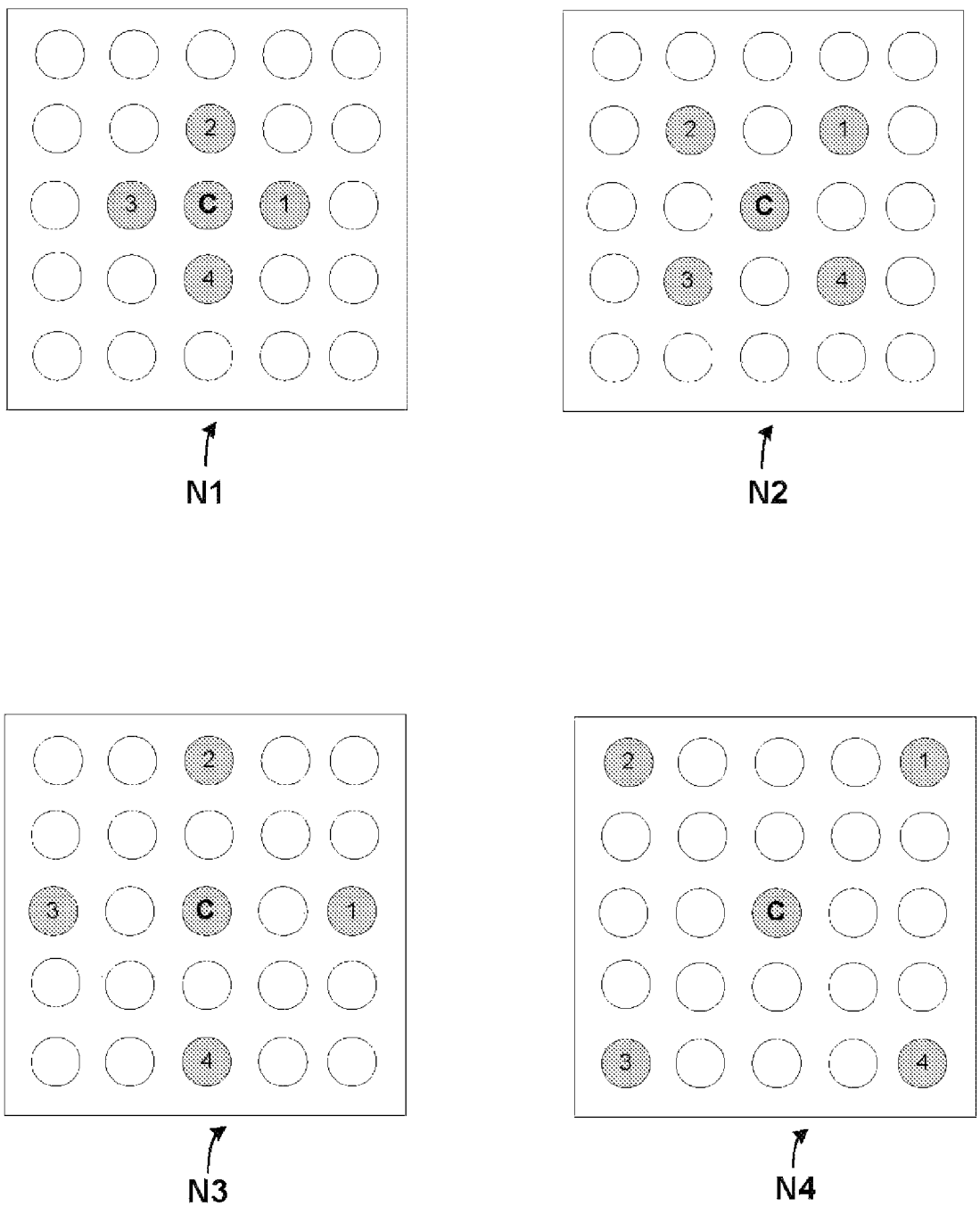
FIG. 5 shows a neighbourhood system of pixels used during texture feature extraction.

At step 214, the calculated threshold value is applied to the edge image in order to generate a black and white (i.e., thresholded) edge image. The black and white edge image, which has only two levels, considerably reduces image processing and data storage overhead compared to a gray-scale edge image having 0-15 intensity levels. Once the black and white edge image is generated, at step 216 the black and white edge image is partitioned into 5×5 pixel array windows. For each pixel array window, a neighbourhood system of pixels within the black and white edge image is generated, as illustrated in FIG. 5. The neighbourhood system of pixels comprises several sub-neighbours in which different pixels within the pixel array window are selected in order to reduce image processing and data storage overhead associated with performing texture extraction on every pixel within the pixel array window. As shown in FIG. 5, four sub-neighbours N1-N4 are selected, such that for the central pixel C of the pixel array window, a different pattern of neighbouring pixels is chosen. By designating a neighbourhood system having the four sub-neighbours N1-N4, processing of pixels in each pixel array window is reduced to a small subset of pixels adjacent the central pixel C.

At step 218, a non-parametric Markov Random Field (MRF) texture analysis model is applied to the selected sub-neighbours N1-N4 (FIG. 9) of each pixel array window within the generated black and white edge image. Within an image processing context, MRF texture models, among other things, provide the ability to model a higher statistical order of the texture without the difficulties associated with parameter estimation. Based on estimating the Local Conditional Probability Density Function (LCPDF) of a set of pixels, the non-parametric MRF model builds a multi-dimensional histogram of the input image. The number of dimensions used in the multi-dimensional histogram is equivalent to the number of sub-neighbours plus one, which is indicative of the statistical order of the model. In this embodiment, a four dimensional histogram based on sub-neighbours N1-N4 is generated, whereby the statistical order of the model is five. There is, however, a practical limit to the selection of the order of the model, especially since the processing complexity increases exponentially with increased statistical order.

Returning to FIG. 5, each sub-neighborhood has four neighbors, where the number denotes the statistical order of the MRF model. The term $F(e_0, e_1)$ represents the frequency of occurrence of the set of edge pixels and non-edge pixels in the edge image. For the multi-dimensional histogram representing the MRF texture model, frequencies $F(e_0, e_1)$ can be decomposed as $F(e_0, e_1)_{Ni}$, for each sub-neighborhood $N_i$, where i=1 to 4. Since the 5×5 neighborhood is decomposed into four sub-neighborhoods, there are only $4 \times (2^5) = 128$ dimensions needed (0-31 for $N_1$; 32-63 for $N_2$; 64-95 for $N_3$; and 96-127 for $N_4$). The full 5×5 neighborhood would require around $2^{25} = 33,554,432$ dimensions.

Figure 6:
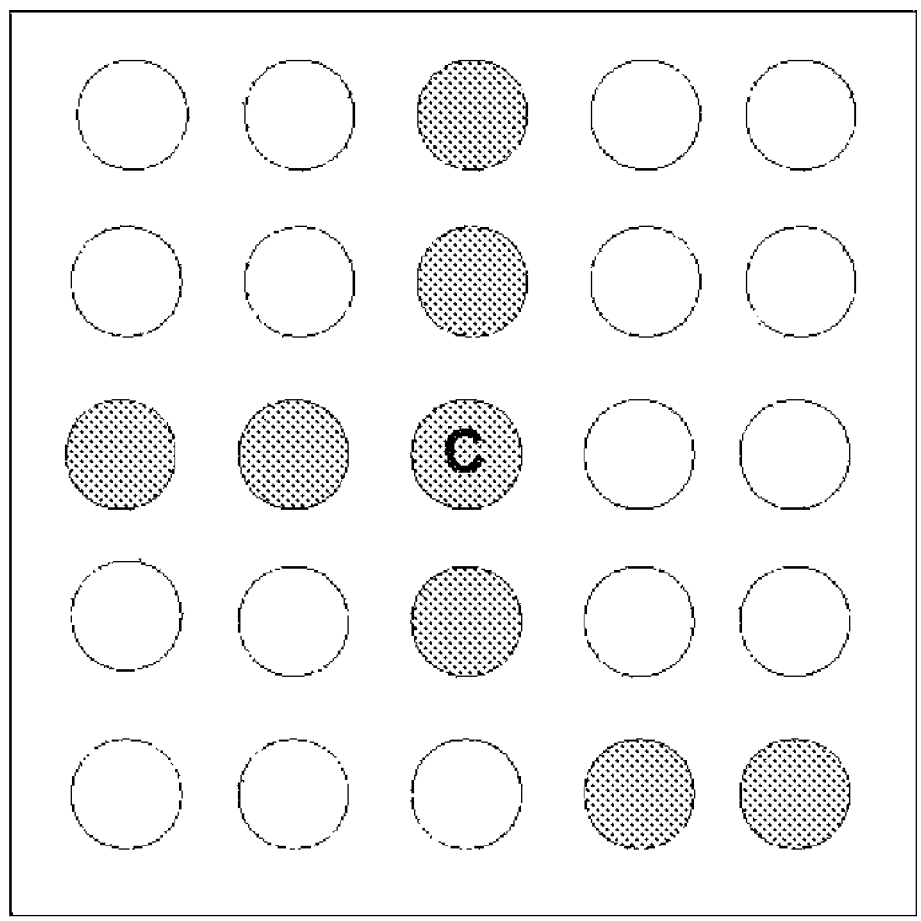
FIG. 6 shows an example of a 5×5 edge image used to calculate a multi-dimensional histogram representing a texture feature set.

FIG. 6 shows an example of a pixel array window of a generated black and white edge image following the application of the threshold value to the edge image at step 214 (FIG. 4). Each edge pixel is represented by a grey pixel and each non-edge pixel is represented by a white pixel. Thus, a total of eight edge pixels, including the centre pixel "C", and seventeen non-edge pixels are shown. Using the MRF model, a multi-dimensional histogram representing a texture feature set is generated using selected sub-neighborhoods $N_1$ to $N_4$, as illustrated in FIG. 6.

Based on selected sub-neighborhoods N1-N4 (FIG. 5), each 4-pixel neighborhood includes the following histogram (N1-N4), whereby:

$$F(e_0, e_i)_{N1} = [0,1,1,1]^T \quad (H_1)$$

$$F(e_0, e_i)_{N2} = [0,0,0,0]^T \quad (H_2)$$

$$F(e_0, e_i)_{N3} = [0,1,1,0]^T \quad (H_3)$$

$$F(e_0, e_i)_{N4} = [0,0,0,1]^T \quad (H_4)$$

For example, in order to determine histogram $H_1$ (above), the position of pixels '1', '2', '3', and '4' within sub-neighborhood NI (FIG. 5) are mapped to pixel array 222 of FIG. 6. The pixel '1' position within pixel array 222 corresponds to a non-edge pixel (i.e., denoted as white). The pixel '2' position within pixel array 222, however, corresponds to an edge pixel (i.e., denoted as grey). Similarly, the pixel '3' and '4' positions within pixel array 222 also correspond to an edge pixel (i.e., denoted as grey). In the histogram notation, a zero (0) designates a non-edge pixel while a one (1) corresponds to an edge pixel. In the $H_1$ histogram, from left to right, the edge and non-edge pixels associated with the pixel position of pixels '1', '2', '3', and '4' within array 222 are identified using the zero (0) and (1) notations. Thus, the edge and non-edge pixels associated with pixels '1', '2', '3', and '4' are represented as 0, 1, 1, 1, respectively, in histogram notation. Histograms $H_2$-$H_4$ are determined in a similar manner.

A multiple histogram having 128 dimensions is then generated, where the total 128 dimensions are represented as having two (2) sets of sixty-four (64) dimensions. Two (2) sets may be needed since a zero (0) and a one (1) are required for denoting a non-edge and an edge, respectively. The sixty-four (64) dimensions correspond to the texture information associated with sub-neighborhoods N1-N4, where a 0-15 index represents sub-neighborhood N1, a 16-31 index represents sub-neighborhood N2, a 32-47 index represents sub-neighborhood N3, and a 48-64 index represents sub-neighborhood N4. Therefore, a non-edge pixel is represented by 64 dimensions associated with texture information, while similarly, an edge pixel is also represented by 64 dimensions associated with texture information.

For example, for sub-neighborhood N1, histogram H1 (i.e., [0,1,1,1]) may be converted from binary to decimal, where from left to right, bit 0 (most significant bit) is in the $2^3$ position, bit 1 is in the $2^2$ position, bit 1 is in the $2^1$ position, and bit 1 (least significant bit) is in the $2^0$ binary position. The decimal equivalent is "0 1 1 1" therefore seven (7). This result is accumulated by one ("1") since the designated central pixel C is an edge pixel. A two-dimensional histogram is therefore represented as F(1,7). For sub-neighborhood N2 (index of 16-31), the decimal value (i.e., 0) of histogram [0,0,0,0] is added to the start of its index value (i.e., 16), which corresponds to a value of sixteen (16). This result is also accumulated by one ("1") since the central pixel C is an edge pixel and a two-dimensional histogram is therefore represented as F(1, 16). For sub-neighborhood N3 (index of 32-47), the decimal value (i.e., 6) of histogram [0,1,1,0] is added to the start of its index value (i.e., 32), which corresponds to a value of thirty-eight (38). This result is also accumulated by one ("1") and the corresponding two-dimensional histogram is represented as F(1,38). Similarly, for sub-neighborhood N4 (index is 48-63), the decimal value (i.e., 1) of histogram [0,0,0,1] is added to the start of its index value (i.e., 48), which corresponds to a value of forty-nine (49). Similarly, this result is also accumulated by one ("1") in order to generate a two-dimensional histogram represented by F[1,49].

Based on accumulating F(1,7), F(1,16), F(1,38), and F(1,49) by one due to the contribution from sub-neighborhoods $N_1$-$N_4$, two-dimensional array F[2][64] is thus generated and represents the MRF texture.

In addition to the above, at step 211 the edge image generated at step 210 is used to populate a localized edge orientation coherence vector matrix (LEOCV). An exemplary localized edge orientation coherence vector (LEOCV) matrix is shown in FIG. 7. The LEOCV matrix is populated by examining local edge orientation coherence/incoherence of each pixel of the edge image. Each row of the localized edge orientation coherence vector matrix includes forty-five (45) bins for edge direction and one (1) bin for non-edges. Each edge direction bin encompasses eight (8) degrees. The bottom row of the LEOCV matrix represents the local edge orientation coherence of the image pixels and the top row of the matrix represents the local edge orientation incoherence of the image pixels.

During population of the localized edge orientation coherence vector matrix, a pixel is deemed to be locally edge orientation coherent, if and only if, one of the pixels within a specified window that is centered on the pixel in question has the same edge orientation. FIG. 8 shows an example of an edge orientation coherence window centered on the subject pixel P. The numbers within the window represent the edge orientation associated with the pixels within the edge orientation coherence window. Thus, in the example of FIG. 8, the subject pixel P has eight (8) local edge orientation coherent pixels (i.e., 70° orientation and denoted in grey) and sixteen (16) local edge orientation incoherent pixels (i.e., denoted in white).

At step 219, the generated MRF texture and LEOCV matrix are combined to yield the signature vector. Both the LEOCV and MRF techniques extract texture information without the need for processing color information within the input image. Thus, texture feature extraction and image categorization may be achieved with more efficiency as a result of the reduced processing overhead.

Figure 9:
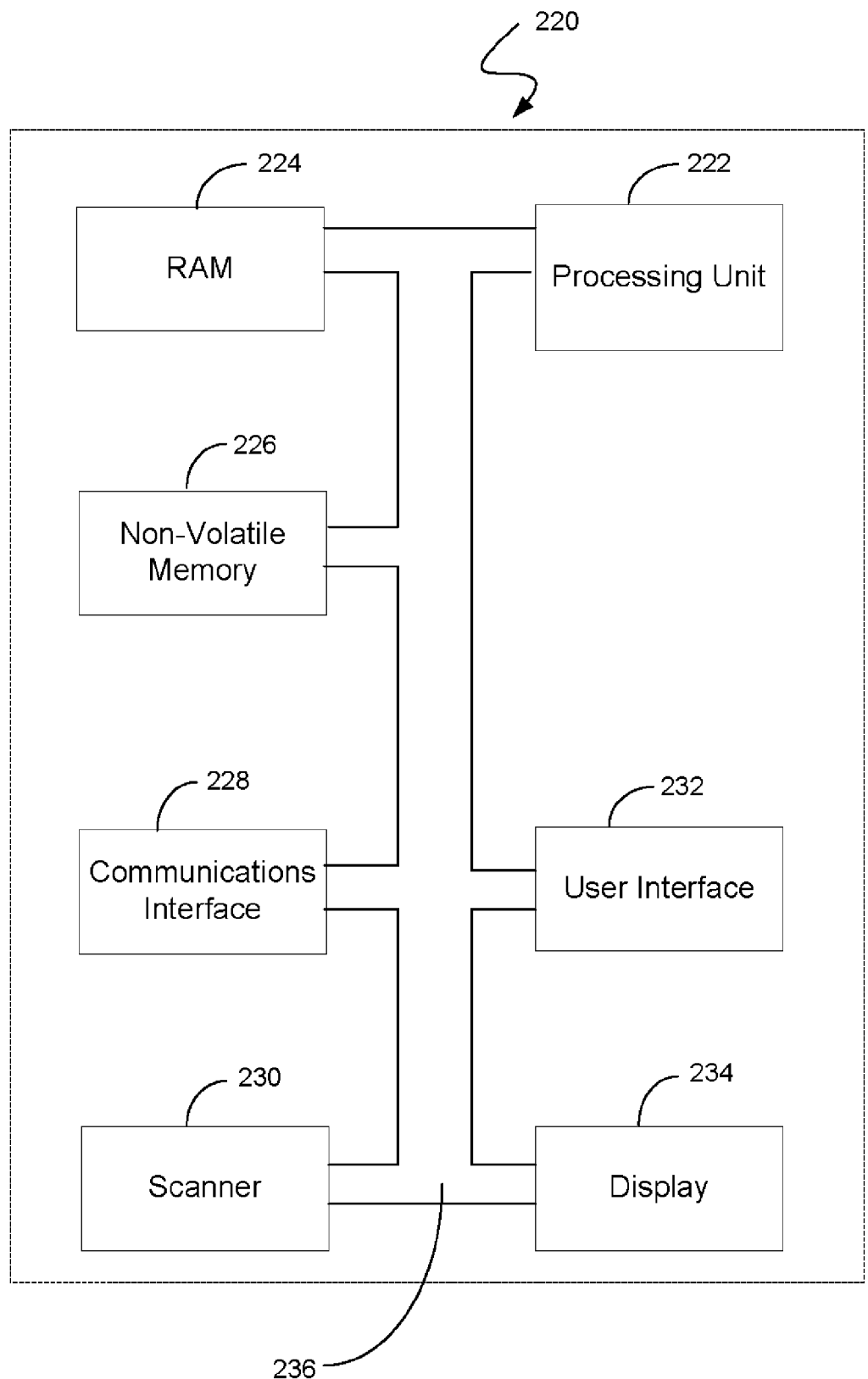
FIG. 9 is a schematic block diagram of an apparatus for automatically categorizing images.

Turning now to FIG. 9, an apparatus 220 for categorizing images according to the method described above is shown. In this embodiment, the apparatus 220 categorizes images into different classes based on their texture. As illustrated, the apparatus 220 comprises a processing unit 222, random access memory ("RAM") 224, non-volatile memory 226, a communications interface 228, a scanner 230, a user interface 232 and a display 234, all in communication over a local bus 236. The processing unit 222 retrieves an image categorization software application program from the non-volatile memory 226 into the RAM 224 for execution. The image categorization software application program performs the input image pre-processing and incorporates LEOCV and MRF algorithms for enabling image categorization based on texture. Upon execution of the image categorization software application program, input images that are received over the communication interface 228 and/or by the scanner 230 are categorized according to several classes (e.g., building category, landscape category, etc.) based on the processing of texture features associated with each of the received images. Once categorized, the processed images may be viewed on display 234. Via user interface 232, a user may elect to transfer the categorized images to a local memory device such as non-volatile memory 226, or to a remote storage device or facility (not shown) by means of communications interface 228. The non-volatile memory 226 may also store additional classifiers that are used to categorically organize images based on image texture or other features.

Although embodiments have been described, those of skill in the art will appreciate that variations and modifications may be made without departing from the spirit and scope thereof as defined by the appended claims.

What is claimed is:

1. A method of automatically categorizing an input image, comprising:
   using a processing unit to:
   extract texture features of said input image based on localized edge orientation coherence and using a non-parametric Markov Random Field (MRF) model and generating a signature vector based on said extracted texture features; and
   process said signature vector using at least one classifier to classify said input image.

2. The method of claim 1, wherein said processing comprises generating weighted outputs using said at least one classifier and evaluating the weighted outputs to classify said input image.

3. The method of claim 2, wherein said at least one classifier comprises back-propagation neural network classifiers.

4. The method of claim 1, further comprising, prior to said extracting, pre-processing said input image.

5. The method of claim 4, wherein said pre-processing comprises at least one of noise filtering and normalizing said input image.

6. The method of claim 4, wherein said pre-processing comprises both noise filtering and normalizing.

7. The method of claim 4, wherein said pre-processing comprises:
   converting said input image to a gray-scale image; and
   normalizing said gray-scale image.

8. A categorization system for automatically categorizing an input image comprising:
   a signature vector generator operative to extract texture features of said input image and generate a signature vector based on extracted features; and
   a processing node network operatively coupled to said signature vector generator and adapted to process said generated signature vector using at least one classifier to classify said input image; and wherein
   said signature vector comprises:
   an edge orientation component; and
   a texture component; and
   said signature vector generator generates the edge orientation component based on local edge orientation coherence of pixels in said input image and generates said texture component based on a non-parametric Markov Random Field (MRF) texture model.

9. A categorization system according to claim 8, wherein each node of said network in response to said signature vector classifies the input image.

10. A categorization system according to claim 8, wherein said network comprises back-propagation neural network classifiers.

11. A method of automatically categorizing an input image, comprising:
    using a processing unit to:
    pre-process said input image to form a gray-scale image;
    generate a first edge image by performing edge detection on said gray-scale image;
    calculate an intensity threshold value from said first edge image;
    apply said threshold value to said first edge image to generate a thresholded edge image; and
    process said thresholded edge image using a non-parametric Markov Random Field (MRF) model to generate texture features for categorizing said input image.

12. The method of claim 11, further comprising processing said texture features using classifiers to classify said input image.

13. The method of claim 11, further comprising normalizing said input image prior to generating said first edge image.

14. The method of claim 11, wherein performing said edge detection comprises performing Canny edge detection.

15. A non-transitory computer-readable medium embodying machine-readable code for categorizing an input image, said machine-readable code comprising:
    machine-readable code for extracting texture features of said input image based on localized edge orientation coherence and using a non-parametric Markov Random Field (MRF) model and generating a signature vector based on said extracted texture features; and
    machine-readable code for processing said signature vector using at least one classifier to classify said input image.

* * * * *